United States Patent [19]

Baer

[11] 4,287,762
[45] Sep. 8, 1981

[54] DIGITAL WEATHER STATION

[75] Inventor: John S. Baer, Bar Harbor, Me.

[73] Assignee: Rainwise, Inc., Pitman, N.J.

[21] Appl. No.: 63,789

[22] Filed: Aug. 6, 1979

[51] Int. Cl.³ ............................................. G01W 1/04
[52] U.S. Cl. ................................................. 73/170 R
[58] Field of Search .................... 73/170 R, DIG. 11;
250/231 SE

[56] References Cited

U.S. PATENT DOCUMENTS

| | | | |
|---|---|---|---|
| 3,237,012 | 2/1966 | Treffeisen | 250/231 SE |
| 3,430,217 | 2/1969 | Bridge et al. | 73/170 R X |
| 3,549,897 | 12/1970 | Blake | 250/231 SE |
| 3,683,294 | 8/1972 | Gaa | 250/233 X |
| 3,742,233 | 6/1973 | Gorgens et al. | 250/231 R |
| 3,997,782 | 12/1976 | Willits | 250/231 SE |
| 4,086,580 | 4/1978 | Schroeder | 250/231 SE X |

Primary Examiner—Jerry W. Myracle
Attorney, Agent, or Firm—John C. Dorfman

[57] ABSTRACT

A totally digitalized weather station provides a digital display with selection elements for selecting a particular transducer and indication elements for indicating which parameter is being sensed at the time. Elements are provided to select from memory maximum and minimum readings of various parameters. Some transducers may employ a broadly new digital technique whereby the dial cooperable with a pointer on the shaft is used to produce digital calibrations which are attached to the shaft and move with the shaft and are read by at least a pair of fixed heads. In non-linear situations, corresponding scales are adjustable rotationally relative to one another to permit the corresponding calibrations of the two scales to be present underneath the respective reading heads simultaneously.

18 Claims, 7 Drawing Figures

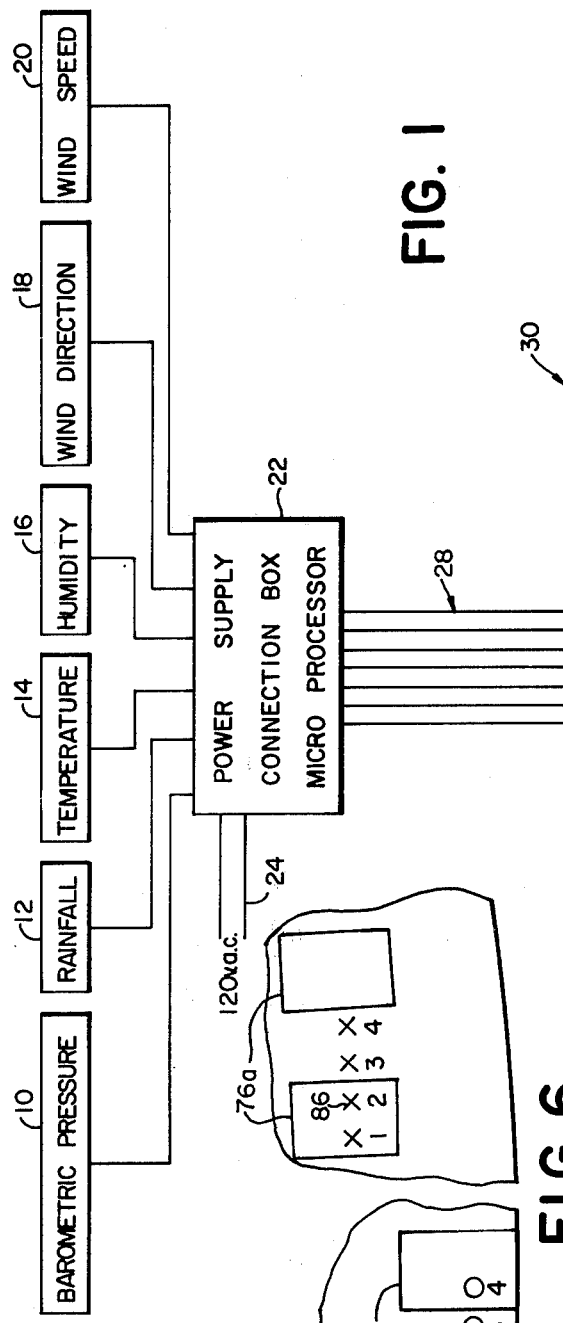
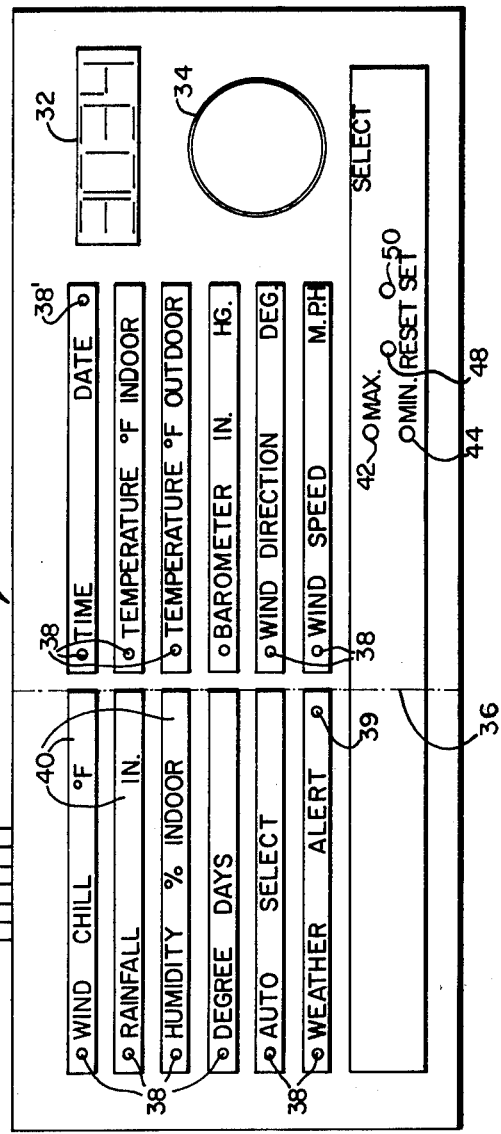
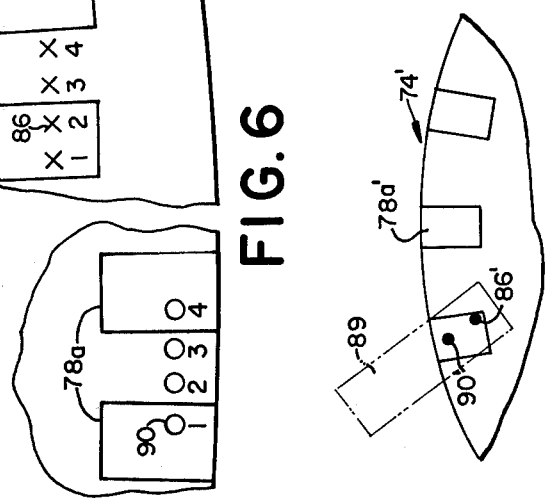
FIG. 1
FIG. 6
FIG. 7

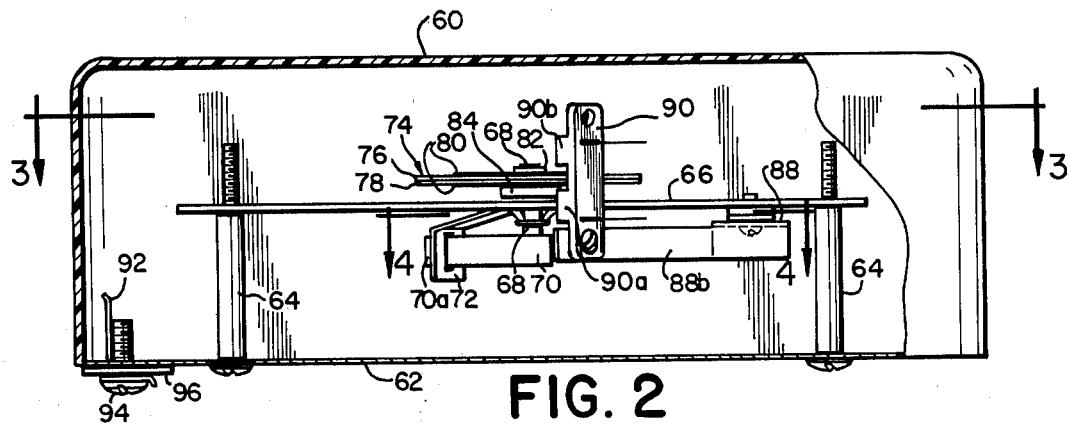
FIG. 2
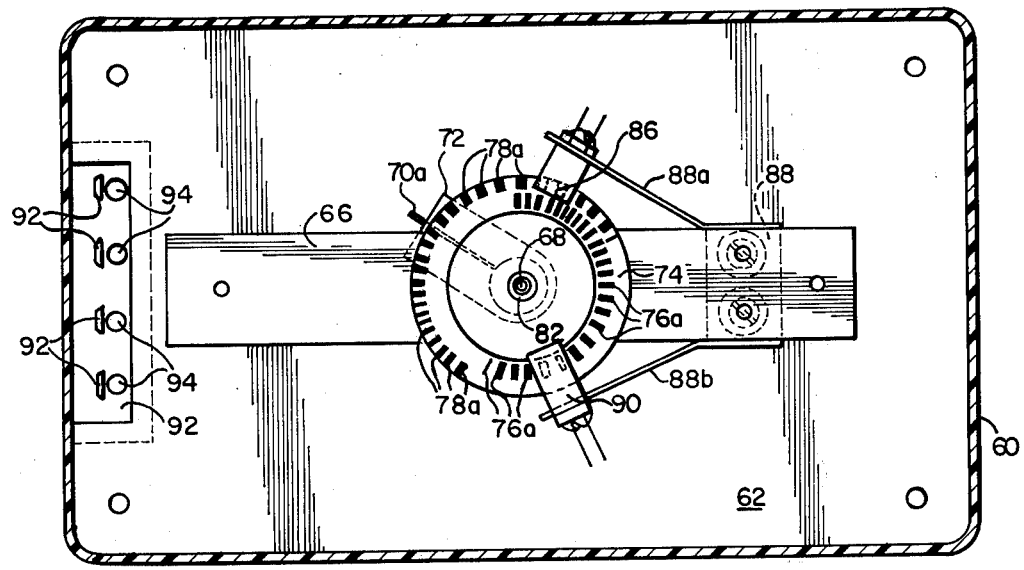
FIG. 3
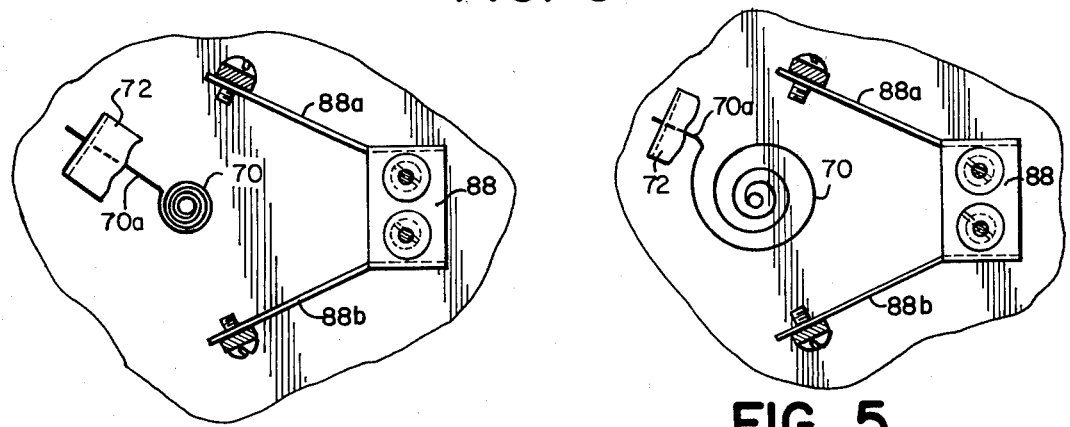
FIG. 4
FIG. 5

DIGITAL WEATHER STATION

The present invention relates to a digital weather station. More specifically, the present invention concerns a system in which various types of weather parameter sensing transducer devices, whether analog or digital in their outputs originally, can have their outputs converted to digital signals. The digital signals, in turn, can be input into counter means using a central display which shows in digital form the various parameters detected by the transducers. The present invention also provides a simple new digital readout gauge means which converts analog to digital whose input is fed to a presetable up/down counter and digital display.

Home weather centers, including barometers, thermometers and possibly a hygrometer, have been popular as long as these instruments have been available. The information supplied by such instruments, however, is often significant only in the room in which they are displayed. Consequently, there have been various types of instruments developed which can be placed out of doors to give information not available from instruments within a house. For example, wind speedometers, weather vanes and rain guages, as well as outdoor thermometers to measure outdoor temperatures have been available for many years. In most cases, these devices require a direct in-place observation so that it is necessary to go from one to another in order to obtain the information required. If the instruments are outside, it is necessary to go outside into whatever weather conditions exist at the time.

Additionally, some weather instrumentation has been digitalized, but much of it remains analog in nature. An example of a digital rain gauge is seen in my U.S. Pat. No. 3,943,762. The digital nature of the display and read out of that device makes it quite possible to have the counter and display located remote from the actual device. The present invention is an extension of this concept wherein display for many parameters is located at one point, preferably indoors. Sensing transducers which detect and measure various weather conditions are able to be located remote from the display and transmit pulse signals to the counter and display.

The system in accordance with the present invention involves a display panel with a digital display which preferably includes a time and date display capability and at least one, and preferably many, other selected weather parameter indications. Manual selectability of parameters displayed is preferably provided, and selection means is normally provided to manually select the information one wishes to know. Alternatively, an automatic scan system may be provided whereby digital display of each of the parameters monitored may be shown in sequence. In such event each type of parameter is identified by its own indicator display or by a separate display position which may be identified. A single illuminated display with sequentially illuminated distributed indicia showing which parameter has been selected is preferred.

The present invention provides the concept that various types of condition sensing instrumentation, not necessarily limited to some weather paramater, may be digitalized. In particular, the present invention provides a means of transforming analog devices which employ a movable analog element, commonly a rotatable shaft, preferably having a pointer cooperating with a calibrated dial, into a digital arrangement. Preferably in such devices, the scale of the calibrated dial is removed from its fixed position and substituted for the pointer. That is the calibrated dial is attached to and moves with the shaft. Stationary reader means, preferably optical pick-up means, is employed to count the calibration marks on the dial as they pass the reader means. The calibration marks typically have to be widened or otherwise size modified but their relative positions to each other remain unchanged. Therefore, photographic processes are useful to generate the calibration marks which have become a digital code pattern and the pttern is then rotatably supported on the shaft. In transferring the dial from its stationary to a movable position, the calibrations have to be reversed (inverted) to provide a mirror image effect. Where the dials are linear, only one dial is required and only one head need be adjustable. In non-linear situations, however, a somewhat more complex double scale arrangement is required in order to sense direction of movement.

More specifically, the present invention concerns various digital readout gauge means for condition sensing, which includes weather parameter sensing.

Calibration means bearing digital calibrations is movably supported relative to support means. The calibration means is coupled to condition sensor means which drives the calibration means so that successive positions of the calibration means are analogs of the parameter being sensed by the condition sensor means. Reader means on the frame cooperates with the calibration means to sense digital calibrations thereon and generates impulses representative of digital count. Up/down counter means provided with selectable starting value receives impulses from the reader means to modify the starting value as counts are added or subtracted by impulse from the reader means. Display means connected to the counter displays the count as a digital output.

The present invention also provides a display unit which has connection to individual instruments for gathering weather information and which feeds digital information to the display. Display consists of at least a time display and plurality of other displays representative of different weather parameters.

The weather parameter sensing transducers are associated with a storage means which permit the storage of sequential values with times and dates for an unlimited period of time but as a practical matter permit display for a specified period of time, such as a year. Means is provided to display selected memory stored information for maximums or minimums. Where maximum or minimum is displayed, the date and time of occurrence in 2400 hour time is displayed in sequence on the same display on the separate display.

In connection with the analog to digital conversion means, a method of reading a transducer having a rotatable output shaft whose position is an analog of value comprises generating digitally countable marks as calibration for a rotational pointer, producing a mirror image of the calibrations, attaching the mirror image to the pointer shaft for rotation of the shaft. In use, the mirror image calibrations on the shaft are counted as they pass a fixed position as the shaft rotates and the count either increases or decreases a reading count for the particular parameter involved.

For a better understanding of the present invention, reference is made to the accompaning drawings in which:

FIG. 1 is a schematic drawing illustrating the system overall and the display panel in particular;

FIG. 2 is a side elevational view showing one transducer and its associated analog-to-digital converter in accordance with the present invention housed in a casing whose sidewall is partially broken away;

FIG. 3 is a plan view from above of the same system taken along line 3—3 of FIG. 2;

FIG. 4 is a sectional view taken along 4—4 of FIG. 2 showing a sensor element in one condition; and FIG. 5 is a similar view of the same structure showing the sensor element in another condition;

FIG. 6 is a diagram showing in greater detail how the two calibration scales are located with respect to the photo readers seen in FIG. 3; and FIG. 7 is a diagram showing the alternative use of two pickups incorporated in a single head and used with a single digital calibration scale.

Referring first to FIG. 1, the various measurement transducers are indicated by boxes 10, 12, 14, 16, 18 and 20. The barometric pressure transducer 10 may be a Bellows type, for example, which commonly is connected to a shaft having a pointer pointing to a pressure calibrated scale. Such a device is relatively easily modified for use in accordance with the present invention, as will be described. Rainfall indicator 12 may be of the type shown in U.S. Pat. No. 3,943,762 which gives a direct digital output which is cumulative. That is, a pulse is generated for each measured increment of rainfall.

The temperature transducer in this instance may be a spiral coil bimetal fixed at one end to a reference frame and attached to a shaft at the other to cause a shaft rotation. Such shaft rotation in ordinary circumstances might be used to drive a pointer cooperating with a fixed calibrated dial. Similar types of thermometers might be used indoors or out and are readily adapted to digital conversion as will be described.

Humidity is commonly a differential indicator as in the wet bulb thermometer type situation, but is also available as a two layer spiral element driving a shaft. Many commercial devices are available similar to thermometers having a shaft output with a pointer cooperating with a fixed calibration dial, which may be adapted as described hereafter in the present application. Wind direction indicator 18 is a relatively direct device such as a weather vane which, in fact, is a pointer. The shaft of this pointer may be connected to a similar shaft for movement in synchronism with that shaft carrying a pointer cooperating with a calibrated dial. Some special modification is probably required to give wind direction readout in accordance with the present invention. For example, two readers are needed to determine positions and a third reader to sense north passing. Similarly, wind speed may use a spring loaded anemometer to drive a speedometer type device the shaft of which carries a pointer cooperating with a fixed calibrated dial. This device is directly convertible for use with the present invention. It is also possible to generate one or more pulses per anemometer device revolution and display them with respect to time.

The outputs of the various transducers 10–20 are fed into a remote system box or boxes generally designated 22. In some cases, power may be needed and supplied by input 24 to a power supply. More usually, direct line connection may be brought into the system. In some cases, the input to a connection box 22 is already digital. In other cases, it may require digital conversion. The digital conversion preferably is made at the transducer location but in some cases may be made at a central location box 22. It is preferred, however, that it not be made at the display panel 30 to which the system is connected through lines 28. Lines 28 preferably supply digital signals to the display panel, and it will be understood that multiple sets of lines, providing at least the equivalent pair of each parameter may be used for this purpose.

The panel itself has a digital numeric display 32 and a manual selection knob 34 which is preferably provided with detent positioning for selection of each of the parameters listed on the display. Other selection means, such as pushbuttons, may alternatively be used. Various numbers of parameters may be provided on a given display and there may be some displays which have only six parameters, in which case a shorter display panel suggested by the dashed line 36 may be employed. A preferred system employs on the order of 12 parameter indicators, each of which is activated upon selection of the meter transducer for that parameter. The reading which appears at the display 32 is identified by one of the indicator lights 38 which are individually illuminated to show when the value of the parameter printed on the associated designator plate 40 is being displayed. The indicator lights and the parameter is selected manually through selector switch dial 34, rotation of which causes illumination of the various indicator lights in predetermined sequence. In addition to selection knob 34, there is a maximum selector pushbutton 42 and a minumum selector pushbutton 44 which may be used to convert the current reading to a maximum reading or a minimum reading, depending upon which pushbutton is selected. Preferably, when the maximum or minimum reading (for example, temperature) is selected by pushing the appropriate button, the selected maximum or minimum reading will alternate with the time and date at which the reading occurred. After a maximum or minimum reading is obtained and time and date have been displayed, reset into normal phase occurs automatically after a preset time. Pushbuttons 48 and 50 are set and reset buttons, respectively. The set button is for putting time and date and other information into the system computer and is done with a combination of actions not unrelated to setting a digital watch. The reset button is to return the contents of a given memory (such as rainfull accumulation) to zero to begin a new accumulation.

In connection with the display, various features are provided. For example, the reading will flash for the barometric pressure, if the pressure is dropping. The system initially will preferably include a microprocessor to handle the various routines and calculations. The system is adaptable to include virtually any parameter and the consumer has the option to buy whatever transducers most interest him. There is accordingly an election as to what is included in the display to some extent and where its plate is located. Time (system clock) and date are standard things to be included, and most systems will include inside and outside temperature and barometer. Normally wind direction and wind speed are also commonly included. Other popular selections will include rainfall, inside humidity and wind chill effect (i.e., the effect of the blowing wind upon apparent temperature). Elective parameters include comfort index, temperature humidity index, humidity, temperature at other selected locations, degree days of heating, degree days of cooling. There can be an automatic scan feature provided. With automatic scan, the system will go through one selection after another. Also, weather alert radio may be included, and preferably is selectable by the manual selection knob 34. The radio speaker may be included in association with the panel.

The digital display 32 may be made of light emitting diodes, liquid crystals, or any other suitable displays, preferably of an electronic variety which requires small amounts of power, although, of course, mechanical devices can be employed. The indicator lights 38, 38', 48 and 50 may be light emitting diodes, as well as glow tubes, or small incandescent bulbs.

The individual transducers may, preferably at the metering locations, include analog-to-digital conversion means, if the output is not directly digital. The digital signal however generated, requires some sort of counter. This can be done by individual counter but preferably is done in the central microprocessor. Direction must be known or sensed so that the counter will be instructed that there are up count or down count pulses to increase or decrease the starting number or a count subsequently developed. One feature of the present invention is reliance upon the accuracy of the counters and pulse sensing so that once the starting has been set, absent a loss of power, no resetting of the counter is required. The display 32 is then coupled through selection switch means controlled by knob 34 to the appropriate counter. Usually the selection switch couples the counter for a particular device to that device and it also applies power to the appropriate indicator light 38. In the case of the barometer, if the down counter is effective, the flasher is energized. The microprocessor which is also preferably included in the system to handle logic and processing for special effects and the like, also stores and deletes from memory as superceded maximum and minimum data from selected transducer which are monitored repeatedly by hour, date and count of each appropriate parameter. The memory can be searched for maximum and minimum for a specified period upon demand, selected by pushbutton 42 or 44.

Referring now to FIGS. 2 through 5, a typical example of a weather monitoring transducer in accordance with the present invention is illustrated. In this case, a humidity sensing transducer is shown with its digital scale sensing optical readers. As seen best in FIG. 2, the device is housed in a box casing 60 which may be of suitable molded resinous material casing 60 is provided with suitable molded columns providing screw receptacles to receive fastening means for holding a generally planar aluminum cover plate 62 in place. The cover plate 62, in turn, serves as a chasis on which is supported by suitably mounted and positioned support posts 64. A mount for the transducer is provided in this case by a metallic strip 66 supported between posts 64 generally parallel to the bottom of the casing and the cover 62. The strip 66 rotatably supports a shaft 68 arranged generally perpendicular to the strip 66. One end of the shaft is connected to the internal end of spiral element 70, which is two layer differential absorption humidity sensing element. The outside end of the spiral element 70 is terminated in a generally radially extending tang 70a which is fixed to and supported by bracket 72. Bracket 72 is an angle bracket supported on the strip support 66, part of the overall support structure.

Mounted at the other end of the shaft 68 and preferably on the opposite side of the support strip 66 from spiral element 70 is a digitally calibrated disc indicator 74 having photo detectable calibrations. In this particular case, the disc indicator is composed of two transparent circular disc members 76 and 78 frictionally supported relative to one another between opposed metallic plates 80 of smaller diameter but the same center, through which is fixed a hollow rivet 82 or similar fastener holding the assembly together. Preferably this assembly is separated from the support strip 66 by a low frictional washer member 84.

The discs 76 and 78, respectively, carry identical calibration marks or digital indicia 76a and 78a which are generally radially oriented and on separate discs at different radii from the center. The discs may be rotationally repositioned relative to one another, but the binding friction forces provided by the composite structure are designed to hold them in selected positions thereafter so that the calibrations maintain a fixed relationship relative to one another. The purpose of this double disc arrangement is to permit the use of non-linear scales with separate reading heads. Alternatively, a single scale may be used with a single head having two photo pickups. In either case, the reading elements must be slightly offset from one another on the same (or corresponding) calibration.

In many linear scale applications, only a single scale is required with two reading heads to determine the up or down count direction.

Calibrations 76a are read by a photo detector 86 supported from the support strip 66 by arm 88a of bracket 88. Arm 88b supports the other photo detector means 90 which reads calibrations 78a. Each photo detector means consists of a molded assembly providing a light source 86a or 90a (such as a light emitting diode) supported in one arm 86a or 90a of the assembly, located in this case beneath the disc pairs. Arm 86b or 90b contains a photo detector. Light from the source in arm 90a passes through the disc assembly 74 and is passed or interrupted by the calibration markings 78a. As the markings pass the photodetector, a step signal is generated, constituting a countable pulse. Detector 86 senses the calibration marks and generates detectable pulses from the calibration 76a in like manner.

Direction of rotation must also be sensed in order to afford a proper input signal into the counter instructing it to count up or count down. FIG. 6 is illustrative of how the reading heads in moving from one calibration to the next can determine the direction of movement. Thus, in addition to using a change of state or a step in a particular direction to indicate a count, the sensors function to record sequence of change of state. By offsetting the pickup heads 86 and 90 relative to the same or corresponding calibration on their respective scales by fraction of the distance across marks, it is possible to get a difference in the sequencing of the same conditions in the pickups 86 and 90. This is illustrated in FIG. 6 by showing the respective scales greatly enlarged and moved closer together so that they can be compared. In this drawing, successive locations of photo pickup 86 with regard to the calibration mark 76a are shown by Xs in successive positions 1, 2, 3 and 4. Similarly, successive positions of slightly offset photo pickup 90 are shown by circles relative to calibrations 78a for the same positions 1, 2, 3 and 4. As will be seen, the one position is offset perhaps half of the width of one of the calibration marks as a result of which assuming the movement of the disc in a clockwise direction or to the left of the diagram which is determined to be upcounting, it will be seen that the photodetector 90 almost immediately moves off of the semi-corresponding calibration mark on which both readers started so that before the time position 2 is assumed, reader 90 has changed state, but reader 88 has not. In the move to the third position, reader 86 changes state but so that it is in the same state reader 90. Then, in the move to position four, reader 90 returns to its original state leaving reader 86 in its position. The following table shows in binary coding the sequence just described.

| Pickup Positions | Binary Sequence Coding | |
|---|---|---|
| | Calibrations | |
| | Nos. 78a | Nos. 76a |
| 1 | 1 | 1 |
| 2 | 0 | 1 |
| 3 | 0 | 0 |
| 4 | 1 | 0 |

It will be observed that the sequence is repetitive and will go through the four changes of state indicated for each of the successive calibrations. But, note the sequence differs depending upon the direction, and it is this difference in sequence that allows determination of the direction move. Of course, the detection may start from any position, but it takes only four changes from whatever position to determine the direction in which the calibrations are moved. Thus, the signals from the photodetectors are fed to logic output associated with the microprocessor to produce an output which tells the counter to count up or count down and the count to be input into the counter may be delayed just long enough to have that determination of direction made properly before the count is registered.

The circuity of various logical operations and other functions performed by the microprocessor and the programs provided are not substantially material to invention, since providing the logic and the program, once the function is understood, is easily within the ability of one skilled in the art.

The provision of the separate discs 76 and 78 permits relative adjustment of the calibrations so that the pickup pads 86 and 90 need not be moved to properly set the calibrations initially. The exact positioning to achieve the proper timing can require great patience and special techniques using oscilloscopes to determine points of change-over. The double disc provides an easy way of initial calibration. Both the scales are the same from a circumferential orientation standpoint, the inner calibration 76a being preferably a slightly reduced photographic reproduction of the same calibration pattern used to produce calibrations 78a. In practice, the calibrations are preferably originally photographed from a fixed dial with which a pointer on the shaft would cooperate and then the width of the calibration marks is increased to give better functioning characteristics. Once the final pattern is arrived at, it can be reproduced in two sizes on the superimposed discs, and the discs assembled as previously described.

It is not necessary to use two scales and two reading heads. As shown in FIG. 7, a single reading head 89 may be provided with two photodetectors 86' and 90'. This is done, for example, by putting a solid state photodetector diodes in line along the radial direction or length of the face. However, in order to be effective the head 89 must not be radially oriented relative to the calibration disc 74 but slightly skewed from that position, as shown in FIG. 6, whereby the detectors 86' and 90' are over different parts of the calibration 78a' at different times so that they can, in turn, generate the sequence table shown above. The wiring connections are not shown in the drawings for the sake of clarity, but it will be understood that each photoemitter and photo detector requires two leads, one of which may be ground. The photo emitters each require a second lead to be at a common potential.

However, each of the second leads of the photo detector effectively carries its own signal generated from its associated calibrated disc. The four potentials represented may be, in turn, connected through respective ones of the four terminals 92, seen in FIG. 3, by means of their screw connections 94. The terminals and the screw connections are supported on insulating terminal strip 96 which is supported across a gap in the cover plate 62.

The present invention contemplates the use of a calibrated dial, in a modification, repositioned from a fixed position on a casing, for example, to a rotatable position on a shaft. The shaft is the shaft which would normally support a pointer to cooperate with calibrations on the dial. The calibrations themselves must be redesigned to provide an acceptable light pattern for pickup by a photosensor. While reflective devices can be used, transparent or light transmissive devices with alternating opaque and transmissive portions are preferred. This can be accomplished in some cases by photography and trimming a heavy photographic negative to circular shape. In most cases, however, making such a calibrated member, the dial is modified to provide a digital cooperative scale. Also, it is important particularly in non-linear situations for calibrations to be effectively a mirror image in position on the shaft to what they would be as a fixed dial. This reversal is necessary so that they will then pass a fixed reader in the same sequence which the pointer would pass the calibrations in a fixed scale arrangement.

The weather station as described provides a display panel wherein digital readout of parameters selected right at the panel may be read regardless of the location of the sensing transducer. Preferably a microprocessor with a memory or storage type device enables an included clock to be used to sequentially store maximum and minimum readings from the various parameters whether displayed or not so that selection of a mixumum/minimum reading can be displayed. Automatic scan may be provided whereby one parameter after another is identified and displayed at the panel, identification being by illumination means, for example, associated with a parameter identifying strip or plaque which may also give the dimensions of the reading. Weather stations may also be included by suitable radio means and speaker means, preferably controlled at the panel with the speaker located proximate to the panel so that the report can be heard while referring to the panel.

The present invention also provides analog to digital conversion which can be used with the output shafts or other rotational devices of a suitable detector for the parameter. It will be clear to those skilled in the art that the techniques described in connection with the rotational shaft may be used similarly in connection with other types of movement, such as linear movement.

It is equally true that the specific forms shown for purpose of illustration in the drawings are intended to be by way of example and not limitation. Other devices capable of performing similar functions may be substituted and modifications of various types may be made in the panel or in the other equipment. All such modifications within the scope of the claims are intended to be within the scope and spirit of the present invention.

I claim:

1. Digital readout gauge means having a rotatable shaft responsive to a condition sensing element for producing a reading of a condition sensed comprising:
   a support means;
   calibration means supported on and rotating with the rotating shaft in the form of a translucent member made from a photographic reproduction providing a mirror image of fixed calibrations used with a pointer on a rotatable shaft having the same analog positions as the shaft, the photographic reproduction providing a pattern of digital calibrations arranged concentric to the shaft whereby as the condition sensor means drives the shaft it drives the calibration means rotatably about the shaft;
   optical reader means to detect calibration marks and absence of calibration marks as a digital calibration pattern and generate an output pattern representative of digital counts;
   means to sense and interpret direction of movement;
   up-down counter means having a selectable starting value and receiving impulses from the reader means to modify the starting value as counts are added or subtracted by impulses from the reader means in accordance with the sensed and interpreted direction of movement; and
   digital display means connected to and displaying the count of the counter.

2. Digital readout guage means for reporting a current condition comprising:
   a support means;
   calibration means bearing non-linear digital calibrations in two separate but identically responsive scales movably supported relative to the support means to be adjustable to one another in the direction of their movement and coupled to a condition sensor means to drive the calibration means so that successive positions of the calibration means are analogs of the parameter being sensed by the condition sensor means;
   separate reader means on the frame cooperating with the respective scales of the calibration means to sense the digital calibrations thereon and generate impulses representative of digital counts, said reader means being slightly offset from one another relative to the corresponding mark, whereby comparison of the sequence of pattern detection discloses direction of movement of the calibration means, the adjustment in position of the scales relative to one another in the direction of movement facilitating proper positioning of the corresponding calibrations relative to the separate photo reader means;
   means to sense and interpret direction of movement;
   up-down counter means having a selectable starting value and receiving impulses from the reader means to modify the starting value as counts are added or subtracted by impulses from the reader means in accordance with the sensed and interpreted direction of movement; and
   digital display means connected to and displaying the count of the counter.

3. Digital readout weather condition sensing guage apparatus comprising:
   a support means;
   calibration means bearing digital calibrations in circular patterns including an output shaft rotatable relative to the support means and coupled to a selected type of weather condition sensor means to drive the shaft so that rotational positions of the shaft are analogs of the parameter being sensed by the condition sensor means, said digital calibrations being calibration patterns in identical circular configurations on separate support discs at different radii with the discs being coaxially supported on the shaft and rotationally movable relative to one another about that axis, the calibrations being a set of non-transmissive marks alternating with light transmission areas, said marks having essentially parallel edges arranged concentrically around the shaft of each of said calibration support means being representative of digital calibration;
   a light source supported on the frame on one side of each support disc,
   separate photo-pickup reader means on the frame for each circular configuration on the other side of the support disc from the light source and sensing the calibrations to generate impulses representative of digital calibration counts;
   means to sense and interpret direction of movement;
   up-down counter means having a selectable starting value and receiving impulses from the reader means to modify the starting value as counts are added or subtracted by impulses from the reader means in accordance with the sensed and interpreted direction of movement; and
   digital display means connected to and displaying the count of the counter.

4. The method of converting into a pulse generating digital output transducer a condition sensing transducer having a rotatable shaft carrying a pointer whose rotational position relative to a fixed calibrated dial face represents an analog of the condition comprising:
   copying proportionally in size and distribution calibration marks from the first tabulated dial face used with the pointer to produce a digital calibrated scale which is a mirror image of the dial face;
   attaching the digital calibrated scale to the movable output member;
   supporting sensing means in fixed position to detect marks of the digital calibrated scale as the output member moves and to detect direction of movement; and
   providing an up-down counter having a selectable starting value responsive to the sensing means to increase or decrease a reading count in accordance with interpretation of direction of movement.

5. The method of claim 4 in which the copying of the dial face is done photographically.

6. The method of claim 5 in which the photographically copied calibration marks from the dial face are modified in width in the direction of motion to be suitable for use with a digital photo pickup.

7. The method of claim 6 in which the dial is copied and involves the calibrations which are enlarged in width in proportion to their spacing from one another.

8. The method of claim 7 in which two translucent disc copies of different enlargement and therefore scale diameter are made and coaxially mounted relative to one another and the movable member which is a rotating shaft so that the discs are movable relative to one another but normally move together on the rotatable shaft past two sensing means one for each scale at the corresponding mark of each scale.

9. A weather display comprising:
a display panel;
sensing means sensing the various parameters on a continuing basic provided with digital outputs of those values to be displayed;
means sensing count direction up or down;
presettable counting means responding to count direction information and counting the digital outputs to enable a digital numeric value to be provided for display;
means for storage of selected values of selected parameters;
digital display means on said panel showing in digital amounts of the various parameters selected for display;
selection means on said panel for selecting parameters available for display;
indicator means on said panel for indicating which of the selected parameters is displayed; and
means on the panel to select display of the stored values alternative to the display of current values of the same parameter.

10. The weather display of claim 9 in which a clock is provided and is provided as an input into a microprocessor and coordinated with continuing parameter inputs to provide readings of the selective parameter and the time of occurrence.

11. The weather display of claim 10 in which means is provided to store maximum readings of selected parameters, means is provided to search the memory to detect the maximum value and display the maximum value alternately with the time at which the maximum value occurred.

12. The weather display of claim 10 in which means is provided to store minimum readings of selected parameters, means is provided to search the memory to detect the minimum value and display the minimum value alternately with the time at which the minimum value occurred.

13. The weather display of claim 10 comprising means to sense rise or fall in reading and generate a pulsating signal to cause flashing or predetermined reading when that reading is headed in a predetermined direction and cause it to appear steady when it is headed.

14. The weather display of claim 10 in which successive positions of selection means illuminating means are activated to indicate which parameter is being displayed currently at the same time the value of that particular parameter is displayed.

15. The weather display of claim 14 in which an automatic scanning feature causes the selection to be periodically changed from display of one parameter value to another.

16. The weather display of claim 9 in which counter means receives digital counts from a transducer providing digital outputs for each of the parameters and the associated counter means counts up or counts down from a predetermined starting value to provide an output representative of the current value and capable of driving the display to show that current value.

17. The weather display of claim 16 in which certain devices are normally analog output devices and are provided with conversion means to convert them to digital outputs so that all weather parameters are output to the counters in terms of digital signals.

18. The weather display device of claim 17 in which the selection means is manual switch means which, in part, connects the counter and the display for the selected parameters.

* * * * *